3,294,365
BLADE FOR USE IN A FLUID-FLOW MACHINE
Geoffrey Light Wilde, Cowers Lane, and Michael Poucher, Allestree, England, assignors to Rolls-Royce Limited, Derbyshire, England, a British company
Filed Nov. 24, 1965, Ser. No. 509,563
Claims priority, application Great Britain, Dec. 2, 1964, 49,099/64
4 Claims. (Cl. 253—77)

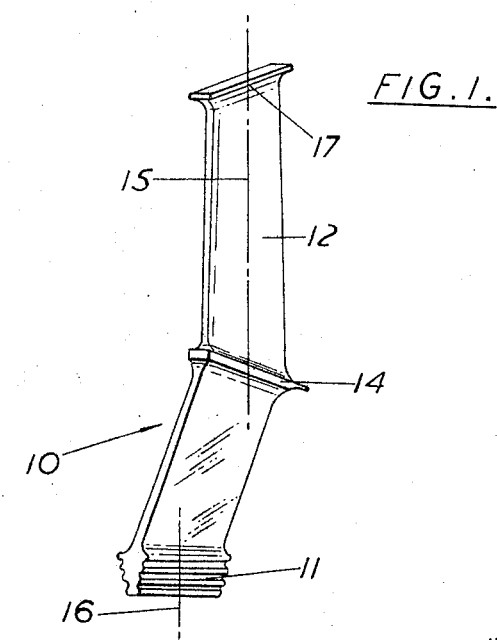
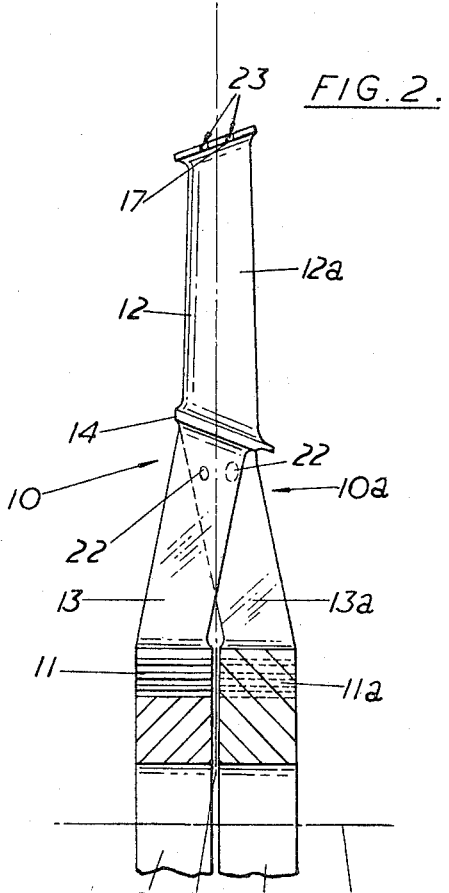

The present invention concerns a blade for use in a fluid-flow machine.

According to one aspect of the invention, there is provided a blade for use in a fluid-flow machine comprising a root portion which is adapted to be attached to a rotatable part of the machine, an aerofoil-shaped portion, and a shank portion which interconnects the root portion and the aerofoil-shaped portion, the aerofoil-shaped portion and thte root portion having substantially radially extending centerlines which are axially displaced from each other.

Thus, when the blade is attached to the rotatable part by means of the root portion, and the rotatable part is rotated, the said centerlines define different planes.

In another aspect of the invention, there is provided a rotor for use in a fluid-flow machine and having a row of blades as set forth above, the root portions of the blades of said row being mounted in a plurality of axially spaced parts of the rotor, and the said blades being arranged so that all their aerofoil-shaped portions traverse the same path when the rotor is rotated.

Preferably, each blade has a cooling fluid passage therein which communicates with a space between the said parts.

The said axially spaced parts may, for example, be constituted by rotor discs.

The invention also includes a fluid-flow machine, such as a gas turbine engine, which is provided with a rotor as set forth above.

The invention is illustrated, by way of example only, in the accompanying drawings, in which:

FIGURE 1 is a side view of a blade in accordance with the present invention, and FIGURE 2 shows part of a turbine of a gas turbine engine in section, the turbine being provided with blades as shown in FIGURE 1.

In FIGURE 1 there is shown a turbine blade 10 of a gas turbine engine. The blade 10 has a root portion 11 having a "fir-tree" configuration of known type so that it can be splined into a complementarily-shaped groove in a turbine rotor disc (not shown in FIGURE 1) of a gas turbine engine. The blade 10 also has an aerofoil-shaped portion 12, the root portion 11 and aerofoil-shaped portion 12 being joined to opposite ends of a shank portion 13. The aerofoil-shaped portion 12 and the root portion 11, in accordance with the invention, have radially extending centerlines 15, 16 respectively which are axially displaced from each other.

At the opposite ends of the aerofoil-shaped portion 12 are attached a shroud 17 and a platform 14 both of which are generally in the form of plates.

The platform 14 and shroud 17 slope oppositely and are adapted to co-operate respectively with the platforms 14 and shrouds 17 of like blades 10 (not shown) on opposite sides thereof to form a conduit between the blades for gas.

In FIGURE 2 are shown the top halves (as illustrated) of two axially spaced turbine rotor discs 18, 19 of a gas turbine engine, the turbine discs 18, 19 being arranged to rotate about an axis of rotation 20. The turbine discs 18, 19 respectively have alternately arranged blades 10, 10a which are splined into fir-tree shaped slots in the turbine discs 18, 19 by means of their respective root portions 11, 11a. It will be seen that the aerofoil-shaped portion 12 of each blade 10 is axially displaced in a downstream direction in relation to its root portion 11, while the aerofoil-shaped portion 12a of each blade 10a (which is hidden behind the aerofoil-shaped portion 12 in the drawing) is axially displaced in an upstream direction in relation to its root portion 11a. The platforms 14 and shrouds 17 of the blades 10, 10a, co-operate to form a conduit for gas therebetween.

Thus, although blades 10 and 10a are disposed on different turbine discs, when the discs are rotated, the aerofoil-shaped portions 12, 12a traverse the same path around the axis of rotation 20.

The arrangement shown in FIGURE 2 enables the diameters of the turbine discs 18, 19 to be relatively small for a large number of blades 10, 10a in the turbine, without so crowding the root portions 11, 11a of the blades 10, 10a as to weaken the discs 18, 19 mechanically. Since the radially outer portions of the turbine discs 18, 19 are not exposed during the operation of the engine to the high temperatures prevailing around the aerofoil-shaped portions 12, 12a, they may be formed from materials whose tensile strength when relatively cool is higher than heretofore, such materials not having previously been much used due to their unfavourable strength characteristics at relatively high temperatures. Alternatively, materials having favourable high temperature strength characteristics may be used to form the turbine discs 18, 19 and the turbine operated at higher temperatures or speeds than heretofore.

Another way in which the invention can be put to use is by forming the turbine discs 18, 19 of materials having a high strength to weight ratio so that, for a given rotational speed the turbine discs 18, 19, a smaller mass of material is required at the reduced diameter of the turbine discs 18, 19 to provide an acceptable strength margin for the said discs.

Although FIGURE 2 shows the row of blades 10, 10a as being carried by two turbine discs 18, 19, the row of blades may be carried by more than two turbine discs provided the aerofoil-shaped portions 12 and root portions 11 are appropriately relatively disposed, and the blades in each turbine disc are sufficiently spaced around the turbine disc having regard to the stresses and temperatures likely to be encountered.

Furthermore, the row of blades 10 may also incorporate turbine blades of known type in which the aerofoil-shaped portions and root portions are generally in the same line, these latter blades being disposed on a turbine disc radially inwards of the row of blades.

In order to provide for cooling of the blades, a cooling fluid such as air bled from the gas turbine engine compressor may be fed to a space 21 between the turbine discs 18, 19. The cooling fluid can then pass to apertures 22 (not shown in FIGURE 1) which lead to internal passages (not shown) in the blades 10, 10a, and the cooling fluid being finally discharged from the blades through apertures 23 in the radially outer faces of the shrouds 17 and/or in the radially inner faces of the platforms 14, or in an alternative, which has not been depicted, in the leading and trailing edges of the aerofoil-shaped portions 12, 12a. This cooling fluid is prevented from leaking out axially of the shank portions 13, 13a by suitable seals which may be, for example, plate-like members (not shown) extending between the leading faces of consecutive shank portions 13 and the trailing faces of consecutive shank portions 13a.

The blades in accordance with the invention may also be utilized otherwise than described, for example in a fluid compressor.

We claim:
1. A rotor for use in a gas turbine engine comprising: a row of angularly spaced apart blades, each of said blades having a root portion, a shank portion, and an aerofoil-shaped portion, said shank portion interconnecting the root portion with said aerofoil-shaped portion and said aerofoil-shaped portion and said root portion of each blade having substantially radially extending centerlines axially displaced from each other; and a plurality of axially spaced parts in which the root portion of said blades are mounted, said blades being arranged so that all of the aerofoil-shaped portions traverse the same path when the rotor is rotated.

2. A rotor for use in a fluid flow machine comprising: a row of blades, each of said blades having a root portion, a shank portion and an aerofoil-shaped portion, said shank portion interconnecting the root portion with said aerofoil-shaped portion and said aerofoil-shaped portion and said root portion of each blade having substantially radially extending centerlines which are axially displaced from each other; a plurality of axially spaced parts in which the root portions of said blades are mounted, said blades being arranged so that all of the aerofoil-shaped portions traverse the same path when the rotor is rotated, each of said blades having a cooling fluid passage therein communicating with a space between said parts.

3. A rotor as claimed in claim 1 in which the said axially spaced parts are constituted by rotor discs.

4. A rotor for use in a gas turbine engine comprising: two axially spaced parts, a plurality of angularly spaced apart blades around the periphery of said parts, each of said angularly spaced apart blades having a root portion and an aerofoil-shaped portion, alternate blades having their respective root portions mounted on alternate axially spaced parts, and said blades having the centerline of their aerofoil-shaped portion off-set with respect to the centerline of their respective root portion so that all of said aerofoil-shaped portions traverse the same path.

References Cited by the Examiner
UNITED STATES PATENTS

| | | | |
|---|---|---|---|
| 1,591,405 | 7/1926 | Shaw | 170—165 |
| 1,886,891 | 11/1932 | Martens et al. | 170—171 |

FOREIGN PATENTS

| | | |
|---|---|---|
| 329,261 | 5/1930 | Great Britain. |
| 662,357 | 12/1951 | Great Britain. |

MARTIN P. SCHWADRON, *Primary Examiner.*

EVERETTE A. POWELL, JR., *Examiner.*